S. C. McKEOWN.
MEANS FOR MOUNTING AND CONNECTING IGNITION BREAKER BOXES.
APPLICATION FILED OCT. 19, 1917.
1,292,837.
Patented Jan. 28, 1919.
2 SHEETS—SHEET 2.
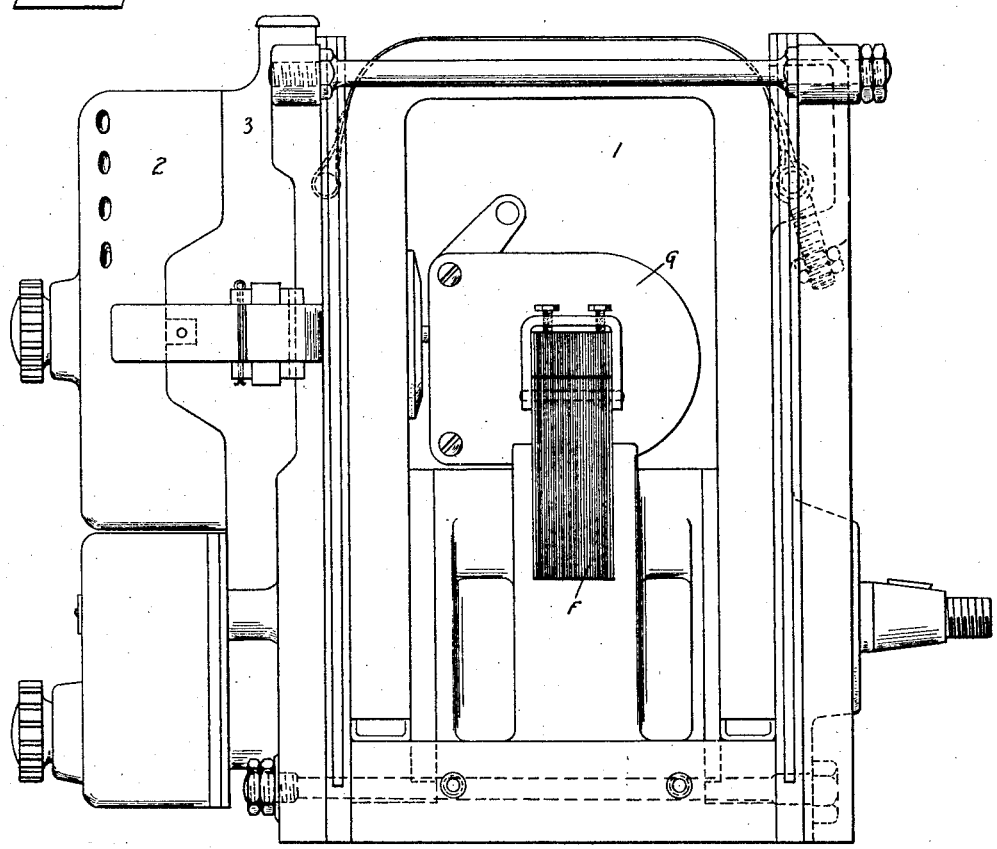
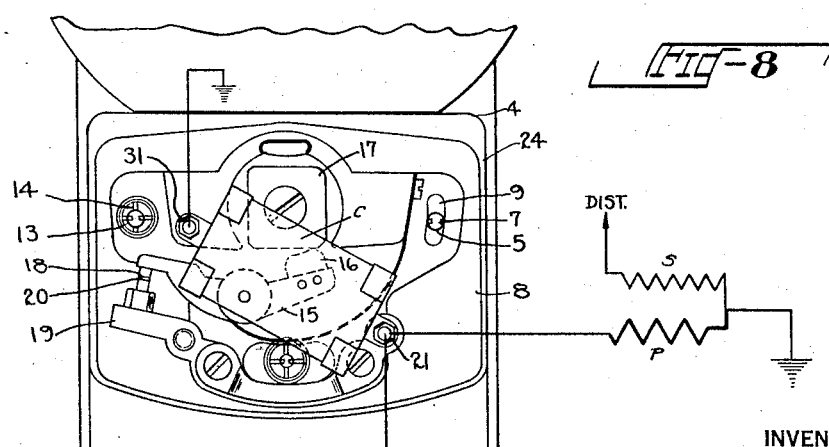
TO CONTROL SWITCH
INVENTOR
SAMUEL C. McKEOWN.
BY Albion D. T. Libby
ATTORNEY

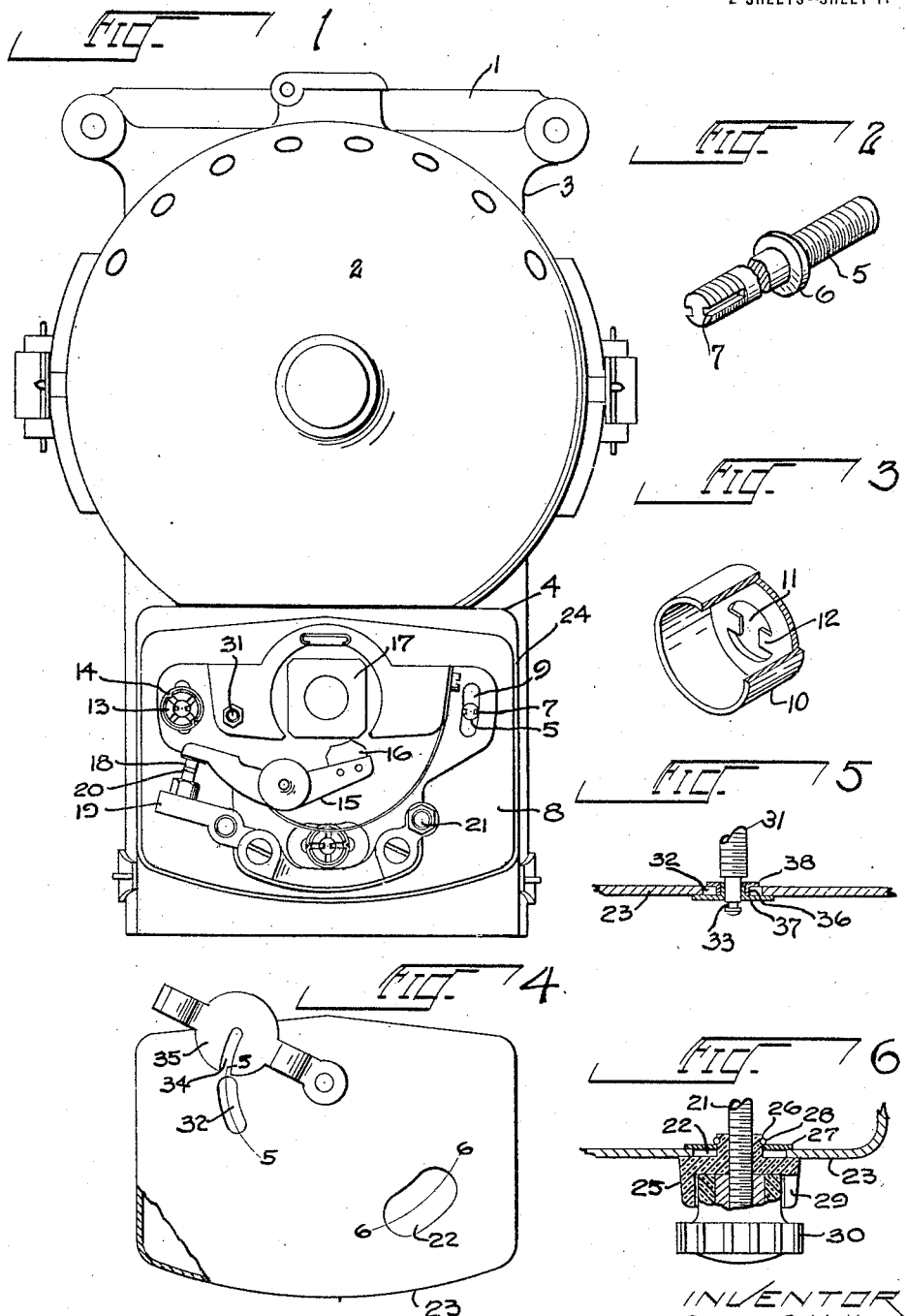

UNITED STATES PATENT OFFICE.

SAMUEL C. McKEOWN, OF EAST ORANGE, NEW JERSEY, ASSIGNOR TO SPLITDORF ELECTRICAL COMPANY, OF NEWARK, NEW JERSEY.

MEANS FOR MOUNTING AND CONNECTING IGNITION BREAKER-BOXES.

1,292,837. Specification of Letters Patent. Patented Jan. 28, 1919.

Application filed October 19, 1917. Serial No. 197,444.

*To all whom it may concern:*

Be it known that I, SAMUEL C. McKEOWN, a citizen of the United States, residing at East Orange, in the county of Essex and State of New Jersey, have invented certain new and useful Improvements in Means for Mounting and Connecting Ignition Breaker-Boxes, of which the following is a specification.

My invention relates to means for mounting a breaker box on an ignition generator in such a way that the box will not become loose thereon. While providing means to securely fasten the box to the generator additional means are provided for adjusting the box to get the maximum efficiency from the generator before locking it in its working position.

Another object of my invention is to provide a quick detachable cover for the breaker box and to provide means in connection with the cover whereby one end of the generator winding may be brought out for the purpose of controlling the functioning of the machine.

In certain types of ignition generators, such as those used on aeroplane engines, it is customary to use what is known as a fixed spark machine, that is to say, the breaker box is not adapted to be operated from a point distant from the machine. However the invention may be applied to generators not specially designed as fixed spark machines, but convertible as such. In the drawings, I have shown a fixed spark ignition generator but have provided a breaker box which can be adjusted during the process of testing the generator so that the operation of the circuit breaker may be properly timed with relation to the break of the rotating element with reference to the field poles. By providing a certain amount of adjustment on the breaker box, which may be subsequently securely locked in its proper working position, I am enabled to take up certain inaccuracies in the manufacture which are bound to occur.

On account of the tremendous vibration on aeroplane engines, ordinary methods of locking the various parts of an ignition generator in working position will not suffice and my invention is therefore directed to special means for fastening the breaker box in its best working position.

Since the cover must inclose the breaker box and fit securely on the immovable mounting plate which carries the box, special means must be provided for fastening the cover to the box and for bringing out the insulated generator lead which is used to control the operation of the machine. My invention is also directed to these details.

Other and further objects will be obvious to one skilled in the art after a study of this specification and drawings, wherein Figure 1 is an end view of an eight cylinder magneto with the breaker box cover removed as well as part of one of the locking devices.

Fig. 2 is a view of one of the studs constituting part of the locking means.

Fig. 3 is a view of a cup lockwasher constituting part of the locking means.

Fig. 4 is an end view of the breaker box cover with its retaining clip attached.

Fig. 5 is a section on the line 5—5 of Fig. 4, with the cover in position on the stud and showing the means for closing the slot in the cover.

Fig. 6 is a sectional view on the line 6—6 of Fig. 4 with the cover in position over the stud and showing the insulator used for insulating the stud from the cover and also serving as means for closing the slot.

Fig. 7 is a side view of the magneto shown in Fig. 1 with one of the cover plates removed to show the generating coil and field structure carrying the same.

Fig. 8 is a view of the lower portion of Fig. 1 showing the diagrammatic connection of the generating coil to the circuit breaker, as well as the condenser carried on certain elements of the circuit breaker.

Referring now to the details, in which like numbers refer to corresponding parts in the various views, 1 is an ignition generator having a distributer block 2 mounted on a support plate 3, the lower part of which carries a breaker box plate 4 which however may be made integral with the plate 3. Passing through the plate 4 and into the plate 3 are studs 5 threaded at both ends and having a shoulder 6 to act as a stop. After the studs 5 are screwed into the plate 3 they may be permanently fastened therein in any suitable manner, such as by pins (not shown). The outer end of each of the studs 5 has one or more grooves 7 cut therein, two grooves being shown in Fig. 2. The grooved ends of the studs 5 project outwardly and are adapted to carry on their ends a breaker box 8 which has elongated slots 9, three being shown in Fig. 1, the upper right hand one showing the stud 5 projecting therethrough. In Fig. 3 is shown a cupped shaped lock-washer 10 which has its bottom perforated at 11 so as to leave fingers 12, corresponding in number to the grooves 7, in stud 5. The cup member 10 is adapted to slide over the outer threaded end of studs 5 after which a castle nut 13, that is a nut having slots cut across its face, is threaded on to the studs 5 within the cup members 10. After the nuts 13 are drawn up tightly the side walls of the cups 10 are indented as at 14 to enter the openings in the castle nuts 13, two such indentations being shown in the upper left hand end of the breaker box. Mounted on the breaker box is a breaker arm 15 carrying a fiber bumper 16 which is acted on by cam 17 driven by the rotating element of the ignition generator. Contact 18 is carried by the breaker arm 15. Securely fastened to the breaker box but insulated therefrom is a block 19 carrying an adjustable contact 20. As is usual in machines of this character one end of the primary winding of the ignition machine is brought out and connected to the block 19, the other end of the primary winding being grounded so that the circuit through the primary winding is opened and closed by the operation of the breaker arm 15.

Securely fastened to the block 19 is a post 21 that extends outwardly passing through the slot 22 in cover 23 which is adapted to fit over the breaker box against the ledge 24 on the plate 4. Since the cover is grounded to the frame of the machine the terminal post 21 must be insulated therefrom and furthermore since the cover 23 is in a fixed position on the support plates 3 and 4 the insulated post 21 must be adapted to move to a new position in the slot 22 when the breaker box is adjusted as previously described. This detail is accomplished as shown in Fig. 6 wherein 25 is an insulator having a shoulder 26 extending through the wall of the cover 23 and held in position by washer 27 and a snap ring 28. The insulator 25 has a slot 29 in its side wall for the reception of a controlling wire running to a switch within reach of the operator. This wire is adapted to be clamped securely in position by a thumb nut 30. It will be understood that the insulator 25 and washer 27 are large enough to cover the slot 22 in all direction of movement of the post 21 so that the opening is effectually covered to keep out dust and dirt, etc.

Securely fastened to the breaker box is a second post 31 extending outwardly through the slot 32 in the cover 23 as shown in Fig. 5. The end of the post 31 has a groove 33 to receive a slot 34 in a spring retaining clip 35 that is pivotally secured to the cover 23. A bushing 36 and washers 37 and 38 constitute a seal for the slot 32 to keep out foreign substances.

From what has been said it will be seen that the cover for the breaker box will receive the posts at all adjustment positions of the breaker box. The posts 21 and 31 are also utilized to carry a condenser in a manner similar to that shown and described in Patent 1,181,623, issued May 2, 1916 to H. R. Van Deventer. The condenser C is shown in Fig. 8 which figure also shows the primary P of the generating coil connected to the post 21 which also has a connection extending to a control switch. Since the post 31 is connected to the frame work of the magneto this constitutes a ground connection and the circuit for the primary of the generating coil will be readily perceived. The secondary of the generating coil is connected to the distributing finger within the block 2 in the usual way. From Fig. 1 it will be observed that the generating coil G is carried in a fixed position on the field pole pieces F, only one of which is shown in Fig. 7.

While I have shown a preferred form of my invention, I do not wish to be limited to the exact details shown, it being understood that equivalent details may be employed.

Having thus described my invention what I claim is:—

1. In combination, an ignition generator having a support plate with studs having threaded grooved ends extending therefrom, a breaker box carrying stationary and movable contacts and having a plurality of holes to receive said studs, said holes being oblong whereby said box may be adjusted, cup shaped washers having notches to fit said grooved stud ends, castle nuts for said studs adapted to fit within said cups whereby when said nuts are drawn up said cup edges are adapted to have portions turned over into the castle nuts, as and for the purpose described.

2. In combination, an ignition generator having a support plate, studs securely fastened to said plate and having threaded ends with one or more grooves therein, a breaker box carrying stationary and movable contacts for the control of the current from said generator, said box having elongated holes therein to receive said studs whereby said box may be adjusted on said plate to properly time the current from the generator, and means for locking said box in its adjusted position, said means consisting of cup members having their bottoms perforated to fit the groove or grooves in said stud ends, castle nuts to fit within said cup members when screwed onto said threaded studs, said cup members being adapted to have sections thereof turned over into the castle nuts as and for the purpose described.

3. In combination an ignition generator having a support plate, studs securely fastened to said plate and having threaded projecting ends, longitudinal grooves in said ends, a breaker box adjustably carried on said support plate by said studs and means for locking said box in adjusted position consisting of cup lock washers having fingers in their bottom part to engage said grooves and castle nuts adapted to screw onto said threaded ends within said cup washers whereby said nuts are securely locked in position by indenting the sides of the cups into the castle nuts, said box having mounted thereon a movable breaker arm and an insulated block carrying a stationary contact, a post on the box and a terminal post attached to the insulated block, a cover for said box adapted to fit on said support plate. elongated slots in said cover for both said posts whereby they will have movement therein when said box is adjusted, means for insulating the said insulated post from said cover and a clip on said cover to engage the other post to hold said cover in position.

4. In an ignition generator having its generating coil in a fixed position, the combination of a breaker box having adjusting means for getting the maximum effect from the generating coil with means for securely locking said box in said adjusted position consisting of threaded studs fastened to the frame of the generator and having grooves therein, slots in said box to receive said studs, cup lock-washers having fingers to fit said grooves and castle nuts adapted to be screwed onto said studs within said cups, said cup walls being adapted to be indented into the slots in the castle nuts, as described.

5. In an ignition generator having its generating coil in a fixed position, the combination of a breaker box having adjusting means for getting the maximum effect from the generating coil with means for securely locking said box in said adjusted position consisting of threaded studs fastened to the frame of the generator and having grooves therein, slots in said box to receive said studs, cup lock-washers having fingers to fit said grooves and castle nuts adapted to be screwed onto said studs within said cups, said cup walls being adapted to be indented into the slots in the castle nuts, and a cover for the breaker box held in place on the frame of the generator by coacting means attached to the box and cover, said cover having a slot therein to permit the said holding means to take up positions corresponding to any adjusted position of the breaker box.

6. In an ignition generator having its generating windings in a fixed position, the combination of a breaker box having a stationary and a movable contact for controlling directly the operation of one of said windings, said box having means for adjustment to get the maximum effect from said windings with means for positively locking said box in said adjusted position consisting of slots in said box, studs fastened to the framework of the generator and having threaded grooved ends passing through said slots, cup lock-washers having fingers in the bottom thereof to fit said grooves and castle nuts adapted to be screwed onto said studs within said cup washers whose sides are adapted to be punched into the spaces on the castle nuts, said breaker box having posts in electrical connection with said stationary and movable contacts and extending outwardly therefrom, a condenser adapted to be mechanically held on said posts and electrically connected to said posts and a cover having a fastening clip attached thereto for said box held in fixed position on the frame by one of said posts and clip, the other post extending through said cover for control connection purposes but insulated therefrom in the manner described, said cover having slots therein for said posts whereby they may take up a position corresponding to the adjusted position of the breaker box.

7. In an ignition generator having its generating windings in a fixed position, the combination of a breaker box having a stationary and a movable contact for controlling directly the operation of one of said windings, said box having means for adjustment to get the maximum effect from said windings with means for positively locking said box in said adjusted position consisting of slots in said box, studs fastened to the frame work of the generator and having threaded grooved ends passing through said slots, cup lockwashers having fingers in the bottom thereof to fit said grooves and castle nuts adapted to be screwed onto said studs within said cup washers whose sides are adapted to be punched into the spaces on the castle nuts, said breaker box having a post in electrical connection with the movable contact and having a groove in its outer end and a second post in electrical connection with the stationary contact, and a cover for said box having a clip pivotally attached thereto, slots in said cover to receive said posts in any adjusted position of the box, said clip being adapted to engage the groove in said post to hold the cover in place over the box, means for closing the slot in the cover around the last mentioned post and means for closing the slot opening in the cover around the other post, said means serving also to insulate said post from the cover as and for the purpose described.

8. In an ignition generator, the combination of a breaker box having adjusting means for getting the maximum effect from said generator with means for securely locking the box in said adjusted position, said means consisting of the following instrumentalities; holes in said box, studs fastened to the generator framework and adapted to pass through said holes, threads and grooves on the ends of said studs, cup shaped lockwashers having fingers to fit said stud ends, castle nuts adapted to screw onto said stud ends and within said washers, said washers having sides adapted to be punched into the spaces in the castle nuts, substantially as described.

9. In an ignition generator, the combination of a breaker box having adjusting means for getting the maximum effect from said generator with means for securely locking the box in said adjusted position, said means consisting of the following instrumentalities; holes in said box, studs fastened to the generator framework and adapted to pass through said holes, threads and grooves on the ends of said studs, cup shaped lockwashers having fingers to fit said stud ends, castle nuts adapted to screw onto said stud ends and within said washers, said washers having sides adapted to be punched into the spaces in the castle nuts, and posts fastened to members on the box and extending outwardly therefrom, a cover for said box having a movable clip thereon, said cover being fastened to the generator framework by the coöperation of one of said posts and said clip said second post being insulated from said cover and serving as a connection to the generator for control thereof, as described.

In witness whereof, I affix my signature.

SAMUEL C. McKEOWN.

Copies of this patent may be obtained for five cents each, by addressing the "Commissioner of Patents, Washington, D. C."